No. 818,055. PATENTED APR. 17, 1906.
C. SOULAS.
TELESCOPE.
APPLICATION FILED NOV. 28, 1904.
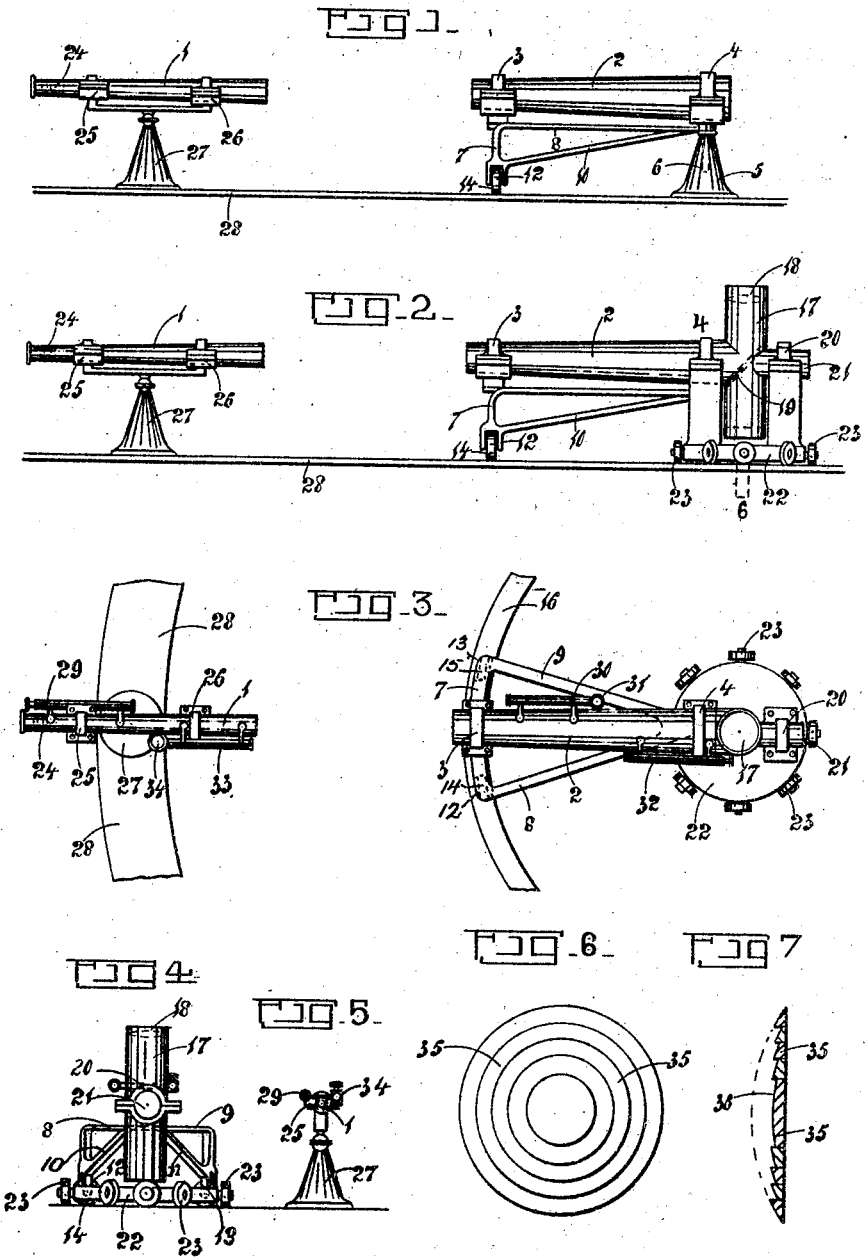
Witnesses
George A. Ellis
E. P. O'Donnell
Inventor
Christophe Soulas
By his Attorney
Harvey H. Hayward

UNITED STATES PATENT OFFICE.

CHRISTOPHE SOULAS, OF OKATO, NEW ZEALAND.

TELESCOPE.

No. 818,055.      Specification of Letters Patent.      Patented April 17, 1906.

Application filed November 28, 1904. Serial No. 234,655.

*To all whom it may concern:*

Be it known that I, CHRISTOPHE SOULAS, a subject of His Majesty the King of Great Britain and Ireland, residing at Okato, in the provincial district of Taranaki, in the Colony of New Zealand, have invented certain new and useful Improvements in Telescopes, of which the following is a specification.

This invention relates to telescopes used for making astronomical observations; and the object of the invention is to provide an instrument of greatly-increased power and of light weight.

I use the usual lens or lenses in the eyepiece and object ends of the instrument; but instead of connecting these ends by the usual tube I dispense with the intermediate part of such tube and have short lengths only at each end. The object end is thus fixed upon a mounting independent of the eyepiece end.

It is necessary in using my instrument that the two ends thereof should be coaxial, and I provide means for effecting this relationship, or, in other words, for causing the focus of the objective lens to fall on the eyepiece-lens. For this purpose I mount a powerful lamp upon each end of the instrument and a small telescope having fine crossed lines upon its object-glass. The light from the lamps is either reflected by a lens or by a mirror in such a manner that the light can be seen through a small tube from the other end of the instrument. The ends of the instrument are brought into coaxial relationship by bringing the small telescopes to bear upon the light of the lamps shining through the small tubes.

The instrument may be of the coudé or elbowed type—that is, with the object-tube formed into a right angle and with the object-lens at the outer end of such tube and a mirror at the angle of the tube inclined at forty-five degrees or a prism producing total refraction. A counterweight is provided to balance the weight of the object-lens and tube. The object-tube is capable of being turned on its horizontal axis, so that it may be moved through an arc of one hundred and eighty degrees. The object-tube may also be rotated in a horizontal plane, and with the combined movements thus obtainable the whole face of the heavens may be observed.

My invention is applicable for refracting or reflecting telescopes.

The invention is illustrated on the accompanying drawings.

Figure 1 is a side elevation of a straight telescope; Fig. 2, a similar elevation of an elbowed or coudé telescope; Fig. 3, a plan; Fig. 4, an elevation of the objective end, and Fig. 5 an elevation of the eyepiece end, of the telescope; Fig. 6, an elevation, and Fig. 7 a cross-section, of a lens.

Referring to Fig. 1 of the drawings, 1 is the eyepiece end, and 2 the objective end, of a straight telescope which is mounted in bearings 3 and 4, the foremost being supported and pivoted upon a standard 5 by means of a pin 6, which passes into the standard and is made integral with the bearing. The rearmost bearing 3 is supported upon a carriage 7, comprising radial arms 8 and 9, diagonal bars 10 and 11, and jaws 12 and 13, in which wheels 14 and 15 are pivoted. The carriage is pivoted upon the pin 6 and is capable of being traversed upon the circular track 16, of which the pin 6 is the center.

On Figs. 2, 3, and 4 of the drawings a coudé telescope is shown, the tube 17 of which is at right angles to the end 2, and an object-lens 18 is fixed in the end of the tube and a mirror 19 placed at an angle of forty-five degrees to tube 17 and end 2. The tube 17 is continued downwardly to form a counterweight to the object end. Instead of a mirror a prism-producing total refraction may be used. Besides the bearings shown in Fig. 1 a third bearing 20 is provided and receives a trunnion 21, fixed to the end 2. In this case the standard 5 is dispensed with and the bearings 4 and 29 are integral with a base-plate 22, which is mounted upon wheels 23, the axles of which are radial to the base-plate. A pivot-pin 6 maintains the base-plate so that it revolves truly upon its center. The end 2 is capable of being rotated on its axis in the bearings 3, 4, and 20, and the tube 17 may thus be moved through an arc of one hundred and eighty degrees. The carriage 7 may be moved in a horizontal plane around the pivot-pin 6, and with these combined movements any part of the heavens may be brought under observation.

The eyepiece end 1 is provided with the usual lenses 24 and is supported in brackets 25 and 26 upon a standard 27, which is placed upon a circular track 28, having the pivot-pin 6 for its center. The standard 27 may be pushed laterally to any position upon its circular track 28, as required to bring the part 1 into coaxial relationship with the part 2 of the telescope.

On Figs. 6 and 7 is shown a lens having circular rings 35, the faces 36 of which are cut to one and the same radius. The thickness of the center of the lens and the weight of the lens are thus materially reduced. The dotted curved line in Fig. 7 is drawn to the same radius as the convex faces of the circular rings and illustrates the amount of material saved by making the lens in accordance with my invention.

To bring the ends 1 and 2 into alinement with each other, I mount a finder-telescope 29 upon the eyepiece end 1 and a tube 30 upon the object end 2. A lamp 31, the light from which is thrown into the tube only, is fitted upon the end of the said tube. The telescope and tube are mounted in relation to each other, so that when the operator looking through the telescope 29 sees the rays of light shining into the tube 30 then the ends 1 and 2 are in alinement. Fine lines across the telescope 29 and tube 30 may be used in the ordinary manner to insure accuracy of adjustment.

To enable an operator at the object end to obtain alinement, a telescope 32 is mounted on the end 2 and a tube 33, having a lamp 34, is provided upon the end 1.

The distinctive and special feature of my invention consists in dispensing with the middle part of the tube of a telescope, leaving eyepiece and object ends, which two parts I may mount as described hereinbefore; but I may replace the standards which support the two ends by any means which will enable the two ends to be kept coaxial and move in such a way relatively to each other that any star or similar object may be brought under observation.

My elbowed telescope may be mounted in equitorial and straight telescope, may have one of its ends mounted on the top of a tower or a steep hill, provided that the mechanism employed for operating the telescope allows three movements—first, around the tower or hill; secondly, vertical movement, and, thirdly, rotation on its own diameter in order to keep the proper focal distance between the two ends and to make them coaxial and to direct the telescope toward the star to be observed.

Having now particularly described and ascertained the nature of my said invention and in what manner the same is to be performed, I declare that what I claim is—

1. A telescope comprising an eyepiece end, brackets carrying the eyepiece end a standard supporting the brackets, an object end comprising a horizontal tube and a tube at right angles to the horizontal tube a counterweight upon the object end, a trunnion upon the object end, bearings carrying the object end, a base-plate integral with the bearings, wheels upon which the base-plate is mounted, a pivot-pin fixed to the base-plate, a rearmost bearing to the object end, a carriage supporting the rearmost bearing, and circular tracks whereon the two ends of the telescope travel, substantially as set forth.

2. A telescope, comprising an eyepiece end, brackets carrying the eyepiece end, a standard supporting the brackets, an object end, bearings carrying the object end, a carriage supporting the rearmost bearing, a standard supporting the foremost bearing, a pin integral with the foremost bearing and passing into the standard and to which the carriage is pivoted as set forth.

3. A telescope, comprising an eyepiece end, a standard upon which the eyepiece end is mounted, a circular track upon which the standard is placed, an object end, a carriage upon which the object end is mounted, a standard to which the carriage is pivoted, and a circular track upon which the carriage travels, as set forth.

4. A telescope, comprising an eyepiece end, a standard upon which the eyepiece end is mounted, a finder-telescope mounted upon the eyepiece end, an object end, a carriage upon which the object end is mounted, a standard to which the carriage is pivoted, a lamp mounted upon the object end, and a tube fitted to the lamp as set forth.

5. A telescope comprising an eyepiece end, a standard upon which the eyepiece end is mounted, a finder-telescope and a lamp mounted on the eyepiece end, a tube fitted to the lamp, an object end, a carriage upon which the object end is mounted, a standard to which the carriage is pivoted, a finder-telescope and a lamp mounted upon the eyepiece end, and a tube fitted to the lamp as set forth.

In testimony whereof I have signed my name to this specification in the presence of two witnesses.

CHRISTOPHE SOULAS.

Witnesses:
E. P. O'DONNELL,
E. S. BALDWIN.